United States Patent [19]

Frische et al.

[11] Patent Number: 5,312,889

[45] Date of Patent: May 17, 1994

[54] HYDROXYFATTY-ACID-BASED MONOMERS FOR PRODUCING PLASTICS

[75] Inventors: Rainer Frische, Frankfurt am Main; Juergen Volkheimer, Wiesbaden, both of Fed. Rep. of Germany

[73] Assignee: Battelle-Institut e.V., Frankfurt am Main, Fed. Rep. of Germany

[21] Appl. No.: 687,933

[22] PCT Filed: Aug. 1, 1990

[86] PCT No.: PCT/EP90/01260

§ 371 Date: Jun. 5, 1991

§ 102(e) Date: Jun. 5, 1991

[30] Foreign Application Priority Data

Aug. 9, 1989 [DE] Fed. Rep. of Germany ....... 3926286

[51] Int. Cl.$^5$ ............................................. C08G 18/36
[52] U.S. Cl. .................. 528/74.5; 528/295.5; 528/338; 528/339; 528/339.5; 554/103; 554/213; 554/219; 562/553; 562/579
[58] Field of Search .................. 528/74.5, 295.5, 338, 528/339, 339.5; 554/103, 213, 219; 562/553, 579

[56] References Cited

U.S. PATENT DOCUMENTS 4,535,142  8/1985  Brauer et al. .................. 528/785
4,744,828  5/1988  Winkel et al. .................. 528/69
4,789,637  12/1988  Preziosi et al. .................. 528/44

FOREIGN PATENT DOCUMENTS 0206074  12/1986  European Pat. Off. .
1495251  1/1969  Fed. Rep. of Germany .
2017510  12/1971  Fed. Rep. of Germany .
2555186  5/1985  France .
2144441  3/1985  United Kingdom .

OTHER PUBLICATIONS

"Synthetic Elastomers . . . " vol. 109, 1988.

Primary Examiner—Maurice J. Welsh
Attorney, Agent, or Firm—Spencer, Frank & Schneider

[57] ABSTRACT

The present invention relates to a new kind of hydroxyfatty-acid-based monomers which are suited for producing plastics and which are obtained by reacting the esters of hydroxyl-group-containing fatty acids or the esters or salts of amino-group-containing fatty acids with appropriate bifunctional compounds that are capable of reacting with hydroxyl or amino groups, the reaction being such that always two molecules of such fatty acid esters are linked together via the hydroxyl groups or the amino groups by means of the bifunctional compound.

12 Claims, No Drawings

HYDROXYFATTY-ACID-BASED MONOMERS FOR PRODUCING PLASTICS

FIELD OF THE INVENTION

The present invention relates to a new group of monomers that are based on hydroxyfatty acids or aminofatty acids as obtained from fats and oils and that are capable of forming polymers.

TECHNOLOGY REVIEW

Natural fats and oils serve not only as starting materials for producing a multitude of technically important basic compositions under certain conditions they can also be used for producing polymers, in particular plastics, though only to a limited extent so far. Given the signs of certain socio-economic changes (in particular, higher environmental protection expenditures and agricultural overproduction) it can be assumed that naturally occurring fats and oils, as so-called renewable raw materials, will be of significantly greater industrial importance in the future.

The hydroxyfatty acids in natural fats and oils and their derivatives, or the hydroxyfatty acids or aminofatty acids that can be produced from reactive fatty acids (e.g., oleic acid, linoleic acid) are particularly suitable for making technically useful products, especially polymers and plastics. For example, oils and fats which, because of their composition, predominantly contain two or more alcohol groups per triglyceride molecule can be reacted with appropriate reactive compounds such as diisocyanates to give polymer structures. Suitable substances for such reactions are, for instance, castor oil or hydrogenated castor oil, which can be and are used directly as triglycerides.

However, the range of application of this method is limited by the available oils and fats. A particular further disadvantage is that the direct use of triglycerides mainly permits formation of polymers that are cross-linked and therefore cannot be processed thermoplastically. Isolating chemically pure fatty acids and producing suitable hydroxyfatty acid derivatives or aminofatty acid derivatives would make it possible to produce a great variety of polymers including thermo plastics. However, producing from native triglycerides chemically uniform fatty acids and fatty acid derivatives is a major problem of oleochemistry both in technical terms and in terms of costs. This even applied to those triglycerides in which one fatty acid is absolutely predominant. That is why very important fatty acids such as ricinoleic acid, which is used in the production of technical process materials, soaps and lubricants, is used in industry only in technical or industrial grade, but not in its pure chemical form.

SUMMARY OF THE INVENTION

The object of the present invention was therefore to produce pure hydroxyfatty acids and aminofatty acids from fatty acid mixtures such as are contained especially in natural fats and oils and moreover, to make these hydroxyfatty and aminofatty acids available in a form that is suitable for further reaction to give polymers.

Therefore, the subject matter of the present invention is monomers obtained by reacting esters of hydroxyl-group-containing fatty acids or esters or salts of amino-group-containing fatty acids, either separately or as mixtures thereof, with bifunctional compounds which are capable of reacting with hydroxyl or amino groups, said reaction being such that two molecules of the fatty acid esters or salts, the fatty acid residues of which may be identical or different, are always linked with each other by means of said bifunctional compound via the hydroxyl groups or the amino groups. These monomers are useful to produce polymeric plastics.

BRIEF DESCRIPTION OF THE DRAWINGS

FIG. 1 illustrates a monomer according to the invention, namely bis[ricinoleic acid methyl ester]diurethane, produced by a "tail-to-tail" linkage of fatty acid esters, namely ricinoleic acid methyl esters via diisocyanate.

FIG. 2 illustrates ricinoleic acid methyl esters linked "head-to-head", not according to the present invention.

DETAILED DESCRIPTION OF THE INVENTION

Monomer production according to the invention is based on the esters of fatty acids containing hydroxyl groups or amino groups, the fatty acid residues preferably having a chain length of 10 to 24 carbon atoms. The methyl or ethyl esters of these fatty acids are particularly useful, which can be produced in the known way from native fats and oils through transesterification with the corresponding alcohols. In the case of amino-group-containing fatty acids, the corresponding salts can also be used. Particularly favourable hydroxyl-group-containing fatty acid esters are the esters of ricinoleic acid and 12-hydroxystearic acid, which clearly predominate in castor oil and hydrated castor oil. The spectrum of available hydroxyfatty acids is broadened by oxidising fats and oils with a particularly high content of unsaturated fatty acids, such as oleic acid, linoleic acid or linolenic acid. It is advisable to set the conditions for reaction in such away that the monohydroxyl derivatives of the acids are primarily produced. When oxidising unsaturated fatty acids by means of performic acid or peracetic acid, for example, this can be accomplished by keeping the temperatures sufficiently low, for example between −5° and +20° C., and the reaction times sufficiently short, so that the epoxides are formed in the first place. These epoxy compounds can then be converted through reductive ring opening into fatty acid products with isolated hydroxyl groups. Thus, either the 9- or the 10-hydroxystearic acid will form from 9,10-stearic acid epoxide.

Oxidation of the fatty acids need not necessarily occur in the triglycerides, but can just as well take place after transesterification.

Amino-group-containing fatty acid residues too are obtained from unsaturated fatty acid esters, using known chemical methods, for example through addition to the double bond of a hydrogen halide such as hydrobromic acid and subsequent nucleophilic substitution of ammonia for the halide.

The hydroxyfatty acid esters or aminofatty acid esters are directly reacted with suitable bifunctional compounds that are capable of reacting with hydroxyl groups or amino groups. According to the invention it is possible to use not only the esters of a single hydroxyfatty acid or aminofatty acid, but also mixtures of the esters of different hydroxyfatty acids or aminofatty acids. In this reaction, two fatty acid esters are always linked together by means of the bifunctional compound, via their hydroxyl or amino groups. The fatty acid esters thus are arranged tail-to-tail in such dimers, and the ester functions are available as head groups for further reactions.

Suitable bifunctional compounds for the reaction are diisocyanates for example, which react to form diurethanes or, in the case of in the case of amino-group-containing fatty acid residues, which react to form urea derivatives. Primarily used are the diisocyanates that are common in plastics production, in particular hexamethylenediisocyanate, methylenebisphenyldiisocyanate (MDI), or diisocyanates of the Desmodur category such as Desmodur T80. Other suitable bifunctional compounds for the reaction are activated dicarboxylic acid derivatives such as acid dichlorides, esters or anhydrides, thioacids or diketenes by which the hydroxyfatty acid esters or aminofatty acid esters in the starting mixture are linked together via two additional ester or amide bonds. Phthalic acid dichloride, adipic acid dichloride, maleic acid dichloride or phosgene are preferred.

Contrary to all expectations, tail-to-tail linkage of hydroxyl-group-containing fatty acid esters with diisocyanates or activated dicarboxylic acid derivatives is relatively straightforward. This result is surprising because it might be assumed that the secondary alcohol groups in the fatty acid residues would not be reactive enough and in addition, and further would be sterically inhibited by the long-chained aliphatic residues. The reaction is likewise complete when the OH group is located close to a double bond, as in the case of ricinoleic acid. Transesterifications were not observed, i.e. the ester groups of the fatty acid esters were not transferred to the dicarboxylic acid derivatives, as might have been expected. What is also astonishing is that the bifunctional compounds can be used not only alone, but also in the form of mixtures. Thus, fatty acid esters are easily linked via the OH groups when using as coupling agents diisocyanate mixtures such as the one with the trade name Desmodur T80. Mixtures of chlorides of various dicarboxylic acids, for instance, a mixture of maleic acid and adipic acid, can also be used without problem.

If necessary, suitable catalysts can be used for the linkage reaction. For example, commercial isocyanate activators such as dibutyldistannic laurate are used for the reaction with diisocyanates. The reaction with activated dicarboxylic acid derivatives, e.g. acid chlorides, is performed advantageously in the presence of pyridine, which converts the acid chloride into an active complex.

To achieve linkage of always two hydroxyfatty acid esters or two aminofatty acid esters by means of the bifunctional compound, it is important that the bifunctional compound be not added in stoichiometric excess relative to its reactive groups, because otherwise the monoderivatives of the bifunctional compounds are also formed with they hydroxyfatty acid esters or the aminofatty acid esters. Therefore, it is advisable to add the bifunctional compounds to the reaction mixture slowly so that each of the active groups has enough time to react with one functional group of one of the hydroxyfatty acid esters.

In order to ensure a homogeneous course of reaction, the reaction can also take place in an appropriate solvent. Tolyene, xylene or pyridine can be used as the solvent.

The reaction is performed at temperatures between about 20° and 150° C. Temperatures between 80° and 120° C. are preferred or, when using solvents, a temperature near the boiling point of the solvent.

The reaction products are recovered in the generally known way. To isolate the diurethanes, urea derivatives, diesters or diamides according to the invention, the whole reaction solution is diluted with cold water when the reaction is complete, and possibly after removing the solvent, in order to withdraw the water-soluble constituents of the reaction mixture. The reaction products as well as any unreacted fatty acid esters separate as an oil. The oil is taken up with an appropriate solvent such as ether, and the aqueous phase is separated off. To remove any possibly present pyridine, the ether phase can be shaken repeatedly with acidic water, e.g. dilute hydrochlorid acid, and then neutralised with sodium bicarbonate solution. After having been separated off, the ether phase is dried and the ether is removed. The desired linked fatty acid esters and fatty acid esters without any functional groups are contained in the residue. The residue is taken up with a suitable solvent such as methanol, ethanol, hexane or ligroin, or with a solvent mixture such as methanol/$H_2O$, and the desired reaction products are isolated by crystallisation. It is also possible to remove first, and to a large extent, the unreacted fatty acid esters by high-vacuum distillation and then recrystallise from the residue the products of the linkage reaction.

A particular advantage of this method of tail-to-tail linkage is that, in addition to the reactive hydroxyfatty acid esters, the starting material can also contain fatty acid esters without any functional groups, because the latter kinds of fatty acid esters cannot react with the bifunctional compounds and therefore have not adverse affect on the reaction. Therefore this method is also excellent for selectively isolating functionalised fatty acids and fatty acid derivatives from fatty acid mixtures with a relatively low content of such fatty acids.

The linked fatty acid esters according to the invention are extremely suitable monomers for producing polymers including thermo plastics. By reaction with diamines, diols, amino alcohols, polyols or polyamines they can be transformed into many different thermoplastic and thermosetting polymers. Linkage results from the head groups, i.e. the free ester functions or possibly the carboxylic functions of the linked fatty acids reacting with the reactive groups of the said bifunctional compounds. The methyl esters and ethyl esters of these compounds are preferably used because the corresponding alcohols, as volatile components, are easy to remove from the reaction mixture so that there is a shift in equilibrium that enhances the linking reaction.

Of particular interest is the completely new class of plastic materials, the polyamide urethanes, in which the polymers are combined according to an absolutely novel structural principle. This type of plastic is obtained by reacting first hydroxyl-group-containing fatty acid esters with the diisocyanates to give the monomer compounds according to the invention, in which reaction urethane bonds are formed, and by then linking the monomer compounds with diamines to give long-chained polymers, using the carboxylic function as amides. The two types of linkage lead to a particularly intensive polar interaction between the polymer chains without impairing the thermoplastic properties of the plastic materials however. If acid dichlorides are used in place of the diisocyanates, the equally intersing polyester amides are obtained, and polyester urethanes or polyesters result when replacing the diamines with diols.

Appropriate diamines or amino alcohols are primary and secondary aliphatic, cycloaliphatic, aliphatic-aromatic and aromatic diamines or amino alcohols, preferably with 2 to 44 carbon atoms. This also includes amines from dimeric fatty acids, among others.

Additional structural elements or further functional groups, such as ether groups, diamide groupings, amino groups, keto groups or sulfone groups may be arranged between the two amino functions of the diamines in the hydrocarbon chain or attached to the cycloaliphatic or aromatic residue. Preferred diamines are 1,2-diaminoethane, 1,3-diaminopropane, 1,6-diaminohexane, 1,8-diaminooctane, piperazine, diethylenetriamine, 4,7,10-trioxatridecane-1,13-diamine, 3,3'-diaminodiphenyl sulfone, 3,3'-dimethyl-4,4'-diaminodicyclohexylmethane and commercial ether diamines of the following formula:

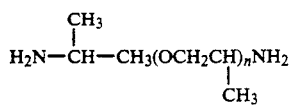

where n is an integral number from 1 to about 2000. 1,2-diaminoethane and 1,6-diaminohexane are particularly preferred. Preferred amino alcohols are 2-aminoethanol and 3-aminopropanol.

Appropriate diols for the reaction are primary and secondary aliphatic, cycloaliphatic, aliphatic-aromatic and aromatic diols, preferably with 2 to 44 carbon atoms. Preferably used are glycol, 1,4-butanediol, 2-butene-1,4-diol, 1,5-pentanediol, 1,6-hexanediol, 1,10-decanediol, neopentyl gylcol, N,N-diethylamine-propanediol-2,3 or hydroxypivalic acid-neopentylglycol ester. 1,4-butanediol and 1,10-decanediol are particularly favored.

The reaction of the individual components is carried out using the known methods of plastics production with which experts are familiar. The individual components are used in equimolecular quantities relative to the functional groups to be reacted, and the reaction is carried out in the temperature range from between 20° and 180° C., preferably in the melt and, as a precaution, in an inert gas atmosphere, for example, of nitrogen.

The special advantage of the method according to the invention consists in the multitude of possibilities which this system provides to vary the properties of the plastics. The properties can be influenced either by the component which links the fatty acids via the carboxyl function, i.e. the diamines or diols, for example, or by the choice of the fatty acid and the bifunctional compound that effects linkage via the hydroxyl or amino groups, i.e. the diisocyanate or the acid dichloride, for example. It is also possible to react mixtures of different monomers to give polymers, whereby the resultant plastics properties are additionally influenced. Quite generally, the rules of classical polymer chemistry have to be observed in this connection. Thus, it should be noted that the flexibility of the plastics will increase as the chain length of the fatty acid residue increases and that the same is true for the length of the various bifunctional compounds that act as linking agents. As the monofatty acid esters that can be obtained from natural fats and oils, which will probably be mainly used as initial substances for producing the monomers according to the invention, usually carry their functional groups roughly in the middle of the fatty acid chain (ricinoleic acid, for example, carries the hydroxyl group at $C_{12}$), the linked polymer chains always contain also more or less long-chained aliphatic residues. Not only do such aliphatic residues render the plastic material hydrophobic, but they also act as internal plasticisers. Therefore, their presence can be used to advantage for obtaining flexible plastics. Vice versa, the polar types of bonds that may occur in this plastic system may counteract the plasticising effect by hydrogen bridge linkages or by the formation of allophanate or else, this possibly undesired effect of the side chains may be compensated by choosing appropriate bifunctional linking elements.

Because of the polarity of the bonds and the favorable adhesive properties that result from it, the plastics obtained in this way are particularly well suited for glass-fiber reinforced composites. The low processing temperature of the system is another advantage in this connection.

These possibilities of variation quite generally permit plastics to be made that are tailored to the respective requirements. It is thus possible to produce plastic materials that can be processed thermoplastically, injection moulded or extruded into sheets or films. Other properties such as tear resistance, stretchability, impact strength, vitrifying point and crystallinity can also be varied within wide limits. However, duroplasts can be fabricated just as well on the basis of the monomers according to the invention.

Another advantage of the present invention is that the compounds that are used as initial monomers already have relatively large molecules compared with the polymers that are normally used for producing plastics, so that the further reaction with bifunctional reactive compounds needs only comparatively few linkage reactions to give linear polymers with sufficient chain length. What is more, the method according to the invention ensures that, even when using mixtures that are not exclusively made up of hydroxyfatty acid esters, only those products of linkage result which have two additional functional groups and that therefore chain breaking cannot occur during polymerisation.

According to the invention, reacting the hydroxyfatty acid esters with bifunctional compounds is also a simple and low-cost way of isolating the hydroxyfatty acids by separating from the linked fatty acid esters the bifunctional group and the alcohol component of the ester and thus relasing the fatty acids. Not only are these fatty acids themselves valuable additives for many technical products, but they can also be used for further reactions that yield a variety of interesting derivatives, for example, oxidation of the OH group. The pure hydroxyfatty acids too can be used as starting material for producing plastics, the structure of which is basically different from that of the plastics which result when directly using the monomers according to the invention. Thus, reacting the free acids, for example 12-hydroxystearic acid, with diisocyanates gives polyurethane foams.

As mentioned before, direct linkage of hydroxyfatty acid-containing triglycerides results only in duroplasts. When making use of the present invention, the fatty acids become accessible in a form that permits production of many kinds of polymeric plastics with a wide range of properties. Since these plastics are furthermore polymers based on initial substances at least part of which can be won from biological sources, it is justified to expect that the plastic products are easily degradable and will therefore be more environmentally compatible in the long run than the known commercial plastics. In addition, the invention permits hydroxyfatty acids that are of great industrial importance, in particular ricinoleic acid, to be produced in ultrapure form and at reasonable expense.

We claim:

1. A monomer for preparation of thermoplastic polymers, said monomer obtained by reacting esters of hydroxyl-group-containing fatty acids or esters or salts of amino-group-containing fatty acids, either separately or as mixtures thereof, with bifunctional compounds which are capable of reacting with hydroxyl or amino groups, said reaction being such that two molecules of the fatty acid esters or salts, the fatty acid residues of which may be identical or different, are always linked with each other by means of said bifunctional compound via the hydroxyl groups or the amino groups.

2. The monomer as set forth in claim 1, wherein methyl ester or ethyl ester is the ester of the hydroxyl- or amino-group-containing fatty acids.

3. The monomers as set forth in claim 1, wherein the hydroxyl-group-containing acid is ricinoleic acid or 12-hydroxystearic acid.

4. The monomers as set forth in claim 1, wherein the bifunctional compound is diisocyanate or an activated dicarboxylic acid derivative.

5. The monomers as set forth in claim 1, wherein the bifunctional compound is methylene-bis-phenylene diisocyanate, hexamethylene diisocyanate, phthalic acid dichloride, adipic acid dichloride, maleic acid dichloride or phosgene.

6. In a method of producing polymers, the improvement comprising linking a monomer according to claim 1 via the carbonyl function with at least one bifunctional compound.

7. The method as set forth in claim 6, wherein the bifunctional compound is selected from the group consisting of diamine, polyamine, amino alcohol, diol or polyol, and mixtures thereof.

8. The method as set forth in claim 6, wherein the bifunctional compound is selected from the group consisting of 1,2-diaminoethane, 1,6-diaminohexane, amino ethanol, 1,4-butanediol, 1,10-decanediol, and mixtures thereof.

9. The monomer as set forth in claim 1, wherein the esters of the hydroxyl group containing fatty acid or the esters or salts of the amino-group-containing fatty acid are obtained from natural oils and fats.

10. The monomer as set forth in claim 1, wherein the bifunctional compound is an activated dicarboxylic acid derivative selected from the group consisting of acid dichlorides, esters and anhydrides.

11. The monomers as set forth in claim 1, wherein the bifunctional compound is an activated dicarboxylic acid, thioacid or diketene by which the hydroxy fatty acid esters or esters or salts of the amino fatty acid in the starting mixture are linked together via two additional ester or amide bonds.

12. The monomer as set forth in claim 1, wherein the bifunctional compound is a diisocyanate which reacts to form a urethane with the hydroxy fatty acid ester and a urea with the amino fatty acid ester or salt thereof.

* * * * *